United States Patent
Xu et al.

(10) Patent No.: US 8,780,597 B2
(45) Date of Patent: Jul. 15, 2014

(54) AC-TO-DC CONVERSION APPARATUS AND RELATED CONTROL MANNER THEREOF

(75) Inventors: Ming Xu, Nanjing (CN); Qiao-Liang Chen, Nanjing (CN)

(73) Assignees: FSP Technology Inc., Taoyuan County (TW); FSP-Powerland Technology Inc., Nanjing (CN)

(*) Notice: Subject to any disclaimer, the term of this patent is extended or adjusted under 35 U.S.C. 154(b) by 78 days.

(21) Appl. No.: 13/547,051

(22) Filed: Jul. 12, 2012

(65) Prior Publication Data

US 2013/0016545 A1 Jan. 17, 2013

(30) Foreign Application Priority Data

Jul. 12, 2011 (CN) ............... 2011 1 0194134

(51) Int. Cl.
*H02M 7/217* (2006.01)

(52) U.S. Cl.
USPC ............................................. 363/127; 363/90

(58) Field of Classification Search
USPC .................. 363/84, 89, 90, 125, 126, 127
See application file for complete search history.

(56) References Cited

U.S. PATENT DOCUMENTS

2004/0047167 A1* 3/2004 Prasad et al. ............. 363/125
2011/0122667 A1* 5/2011 Mino et al. ............... 363/125

* cited by examiner

*Primary Examiner* — Nguyen Tran
(74) *Attorney, Agent, or Firm* — Jianq Chyun IP Office

(57) ABSTRACT

An AC-to-DC conversion apparatus is provided, and which includes a first switch-element, an output capacitor and a bridgeless power-factor-correction (PFC) circuit. The bridgeless PFC circuit is coupled to an AC input, and includes a first inductor, a second inductor and a bridge circuit constructed by second to fifth switch-elements. The first switch-element is connected between bridgeless PFC circuit and the output capacitor. Under such circuit configuration and suitable control manner, the common-mode interference in the provided AC-to-DC conversion apparatus is lowered and thus reducing the power loss.

15 Claims, 18 Drawing Sheets

US 8,780,597 B2

AC-TO-DC CONVERSION APPARATUS AND RELATED CONTROL MANNER THEREOF

CROSS-REFERENCE TO RELATED APPLICATION

This application claims the priority benefit of China application serial no. 201110194134.8, filed on Jul. 12, 2011. The entirety of the above-mentioned patent application is hereby incorporated by reference herein and made a part of this specification.

BACKGROUND OF THE INVENTION

1. Field of the Invention

The present invention relates to an AC-to-DC conversion apparatus, in particular, to an AC-to-DC conversion apparatus capable of reducing the common-mode interference and applied in the fields of power factor correction (PFC), reactive power compensation and harmonic compensation, and a related control manner thereof.

2. Description of Related Art

Nowadays, the development trend of power factor correction (PFC) has been toward high efficiency, simple structure, easy control and lower electromagnetic interference (EMI). Therefore, as an effective way to increase efficiency, a bridgeless boost PFC circuit gets more and more attentions. A rectifier bridge of the traditional boost PFC circuit is omitted in the bridgeless boost PFC circuit. At any time, the number of conducting diodes in the bridgeless boost PFC is always one diode less in conduction than that of the traditional boost PFC with the rectifier circuit. Consequently, the conduction loss is lowered, and the efficiency is significantly increased accordingly.

A basic structure of a bridgeless boost PFC main circuit is illustrated in FIG. 1, and which is consisting of two fast recovery diodes D1, D2, two switch-transistors S1, S2 each having a body diode, two inductors L1, L2 and a capacitor C. The bridgeless boost PFC is configured to provide a DC output bus voltage (Vbus) to a load R. For a positive half cycle and a negative half cycle of a power-frequency AC input (Vline), the bridgeless boost PFC circuit can be equivalent to a combination of two boost PFC circuits with opposite powers.

One of the two boost PFC circuits with opposite powers is consisting of the inductors L1, L2, the switch-transistor S1, the diode D1 and the body diode of the switch-transistor S2, and operated under as a conduction (operation) mode illustrated in FIG. 2(a). The other one of the two boost PFC circuits with opposite powers is consisting of the inductors L1, L2, the switch-transistor S2, the diode D2 and the body diode of the switch-transistor S1, and operated under as a conduction (operation) mode illustrated in FIG. 2(b). It can be clearly seen from FIGS. 2(a) and 2(b) that only two semiconductor elements are conducted in the bridgeless boost PFC circuit at any time, i.e., the number of conducting elements thereof is one diode less in conduction than the traditional boost PFC circuit with the rectifier bridge. Therefore, the conduction loss is reduced and the efficiency is increased accordingly.

However, the main problem of the circuit as shown in FIG. 1 is high common-mode interference. To be specific, waveforms $V_{ON}$, $V_{AN}$, $V_{BN}$ illustrated in FIG. 3 can be obtained by analyzing the electric potentials respectively between the node A and the input neutral line N, between the node B and the input neutral line N, and between the node 0 and the input neutral line N, wherein $V_{bus}$ is the DC output bus voltage, and $V_{line}$ is the instantaneous input voltage. It can be clearly seen from FIG. 3 that the electric potentials of the node 0 of the DC output bus, the node A and the node B with respective to the power input side are swing with a frequency of switching the switch-transistors S1, S2. Consequently, the common-mode interference is more serious, and the EMI issue is more outstanding. The problem of common-mode interference and EMI issue needs to be improved.

In addition, referring FIG. 4 with FIG. 1, when the diodes D1 and D2 are cut off, there is no low resistance path is connected with the parasitic capacitor Crss in parallel. Accordingly, the AC-excitation input source will have a current path as the dotted line illustrated in FIG. 4, and thus, a large leakage current will flow through the parasitic capacitor Crss.

SUMMARY OF THE INVENTION

Accordingly, in order to solve the problems mentioned in the above "BACKGROUND OF THE INVENTION", the present invention is directed to an AC-to-DC conversion apparatus capable of reducing the common-mode interference and the power loss, and a related control manner thereof.

An exemplary embodiment of the present invention provides an AC-to-DC conversion apparatus including a first switch-element, an output capacitor and a bridgeless power factor correction (PFC) circuit. The bridgeless PFC circuit includes a bridge circuit constituted by second to fifth switch-elements, a first inductor and a second inductor. The second and the third switch-elements are connected in series to form a first series branch, the fourth and the fifth switch-element are connected in series to form a second series branch, and the first series branch and the second series branch are connected in parallel.

A first terminal of the first inductor is connected to a first terminal of an AC input, and a second terminal of the first inductor is connected to a common node between the second and the third switch-elements. A first terminal of the second inductor is connected to a second terminal of the AC input, and a second terminal of the second inductor is connected to a common node between the fourth and the fifth switch-elements.

A first group of switch-elements include the second and the fourth switch-elements, and are implemented by controllable switch-elements or diodes. A second group of switch-elements include the third and the fifth switch-elements, and are implemented by controllable switch-elements or diodes. At least one of the first group of switch-elements and the second group of switch-elements are implemented by controllable switch-elements.

A first terminal of the first switch-element is connected to one of a common node between the second and the fourth switch-elements and a common node between the third and the fifth switch-elements. A second terminal of the first switch-element is connected to a first terminal of the output capacitor. A second terminal of the output capacitor is connected to the remaining one of the common node between the second and the fourth switch-elements and the common node between the third and the fifth switch-elements.

In an exemplary embodiment of the present invention, the first switch-element, the first group of switch-elements and the second group of switch-elements are implemented by controllable switch-elements, and the controllable switch-elements are MOSFETs. In this case, the first switch-element is a first MOSFET, the second switch-element is a second MOSFET, the third switch-element is a third MOSFET, the fourth switch-element is a fourth MOSFET, and the fifth switch-element is a fifth MOSFET. A source of the second MOSFET is connected to a drain of the third MOSFET, a source of the fourth MOSFET is connected to a drain of the fifth MOSFET, a drain of the second MOSFET is connected to a drain of the fourth MOSFET, and a source of the third MOSFET is connected to a source of the fifth MOSFET.

In an exemplary embodiment of the present invention, in case that the first to fifth switch-elements are implemented by MOSFETs, a source of the first MOSFET may be connected to the drains of the second and the fourth MOSFETs, and a drain of the first MOSFET may be connected to the sources of the third and the fifth MOSFETs through the output capacitor. In this case, in a positive half cycle of the AC input, the second MOSFET is kept at an on-state, the fourth MOSFET is served as a master switch, the first and the fifth MOSFETs are switched synchronously, a switching of the fourth MOSFET is complementary to that of the first and the fifth MOSFETs, and the third MOSFET is kept at an off-state; and in a negative half cycle of the AC input, the fourth MOSFET is kept at the on-state, the second MOSFET is served as the master switch, the first and the third MOSFETs are switched synchronously, a switching of the second MOSFET is complementary to that of the first and the third MOSFETs, and the fifth MOSFET is kept at the off-state.

In another exemplary embodiment of the present invention, in case that the first to fifth switch-elements are implemented by MOSFETs, a source of the first MOSFET may be connected to the drains of the second and the fourth MOSFETs through the output capacitor, and a drain of the first MOSFET may be connected to the sources of the third and the fifth MOSFETs. In this case, in a positive half cycle of the AC input, the third MOSFET is kept at an on-state, the fifth MOSFET is served as a master switch, the first and the fourth MOSFETs are switched synchronously, a switching of the fifth MOSFET is complementary to that of the first and the fourth MOSFETs, and the second MOSFET is kept at an off-state; and in a negative half cycle of the AC input, the fifth MOSFET is kept at the on-state, the third MOSFET is served as the master switch, the first and the second MOSFETs are switched synchronously, a switching of the third MOSFET is complementary to that of the first and the second MOSFETs, and the fourth MOSFET is kept at the off-state.

In an exemplary embodiment of the present invention, the first switch-element and the first group of switch-elements are implemented by controllable switch-elements, and the controllable switch-elements are MOSFETs. The second group of switch-elements are implemented by diodes. In this case, the first switch-element is a first MOSFET, the second switch-element is a second MOSFET, the third switch-element is a third diode, the fourth switch-element is a fourth MOSFET, and the fifth switch-element is a fifth diode. A source of the second MOSFET is connected to a cathode of the third diode, a source of the fourth MOSFET is connected to a cathode of the fifth diode, a drain of the second MOSFET is connected to a drain of the fourth MOSFET, and an anode of the third diode is connected to an anode of the fifth diode.

In an exemplary embodiment of the present invention, in case that the first switch-element and the first group of switch-elements are implemented by MOSFETs and the second group of switch-elements are implemented by diodes, a source of the first MOSFET is connected to the drains of the second and the fourth MOSFETs, and a drain of the first MOSFET is connected to the anodes of the third and the fifth diodes through the output capacitor. In this case, in a positive half cycle of the AC input, the second MOSFET is kept at an on-state, the fourth MOSFET is served as a master switch, and a switching of the first MOSFET is complementary to that of the fourth MOSFET; and in a negative half cycle of the AC input, the fourth MOSFET is kept at the on-state, the second MOSFET is served as the master switch, and the switching of the first MOSFET is complementary to that of the second MOSFET.

In an exemplary embodiment of the present invention, the first switch-element and the second group of switch-elements are implemented by controllable switch-elements, and the controllable switch-elements are MOSFETs. The first group of switch-elements are implemented by diodes. In this case, the first switch-element is a first MOSFET, the second switch-element is a second diode, the third switch-element is a third MOSFET, the fourth switch-element is a fourth diode, and the fifth switch-element is a fifth MOSFET. An anode of the second diode is connected to a drain of the third MOSFET, an anode of the fourth diode is connected to a drain of the fifth MOSFET, a cathode of the second diode is connected to a cathode of the fourth diode, and a source of the third MOSFET is connected to a source of the fifth MOSFET.

In an exemplary embodiment of the present invention, in case that the first switch-element and the second group of switch-elements are implemented by MOSFETs and the first group of switch-elements are implemented by diodes, a drain of the first MOSFET is connected to the sources of the third and the fifth MOSFETs, and a source of the first MOSFET is connected to the cathodes of the second and the fourth diodes through the output capacitor. In this case, in a positive half cycle of the AC input, the third MOSFET is kept at an on-state, the fifth MOSFET is served as a master switch, and a switching of the first MOSFET is complementary to that of the fifth MOSFET; and in a negative half cycle of the AC input, the fifth MOSFET is kept at the on-state, the third MOSFET is served as the master switch, and the switching of the first MOSFET is complementary to that of the third MOSFET.

In an exemplary embodiment of the present invention, the first switch-element is implemented by a diode, the first group of switch-elements and the second group of switch-elements are implemented by controllable switch-elements, and the controllable switch-elements are MOSFETs. In this case, the first switch-element is a first diode, the second switch-element is a second MOSFET, the third switch-element is a third MOSFET, the fourth switch-element is a fourth MOSFET, and the fifth switch-element is a fifth MOSFET. A source of the second MOSFET is connected to a drain of the third MOSFET, a source of the fourth MOSFET is connected to a drain of the fifth MOSFET, a drain of the second MOSFET is connected to a drain of the fourth MOSFET, and a source of the third MOSFET is connected to a source of the fifth MOSFET.

In an exemplary embodiment of the present invention, in case that the first switch-element is implemented by diode and first group of switch-elements and the second group of switch-elements are implemented by MOSFETs, an anode of the first diode is connected to the drains of the second and the fourth MOSFETs, and a cathode of the first diode is connected to the sources of the third and the fifth MOSFETs through the output capacitor.

In another exemplary embodiment of the present invention, in case that the first switch-element is implemented by diode and first group of switch-elements and the second group of switch-elements are implemented by MOSFETs, an anode of the first diode is connected to the drains of the second and the fourth MOSFETs through the output capacitor, and a cathode of the first diode is connected to the sources of the third and the fifth MOSFETs.

From the above, in the present invention, the first switch-element is configured to connect between the bridgeless PFC circuit and the output capacitor, so under the provided control manner relating to the switching of the switch-elements (specifically for MOSFETs), the common-mode interference in the provided AC-to-DC conversion apparatus is effectively lowered and thus reducing the power loss.

In order to make the aforementioned and other features and advantages of the invention comprehensible, several exemplary implementations accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
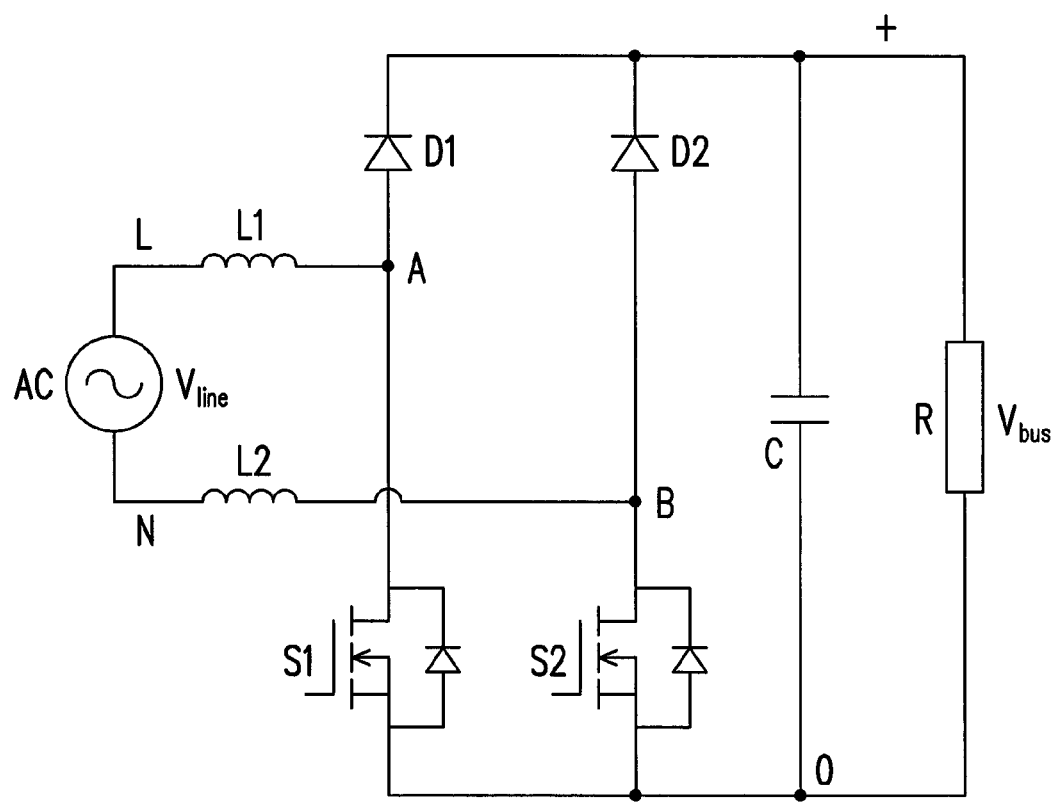
FIG. 1 is a schematic diagram of a common bridgeless PFC circuit.
Figure 2A:
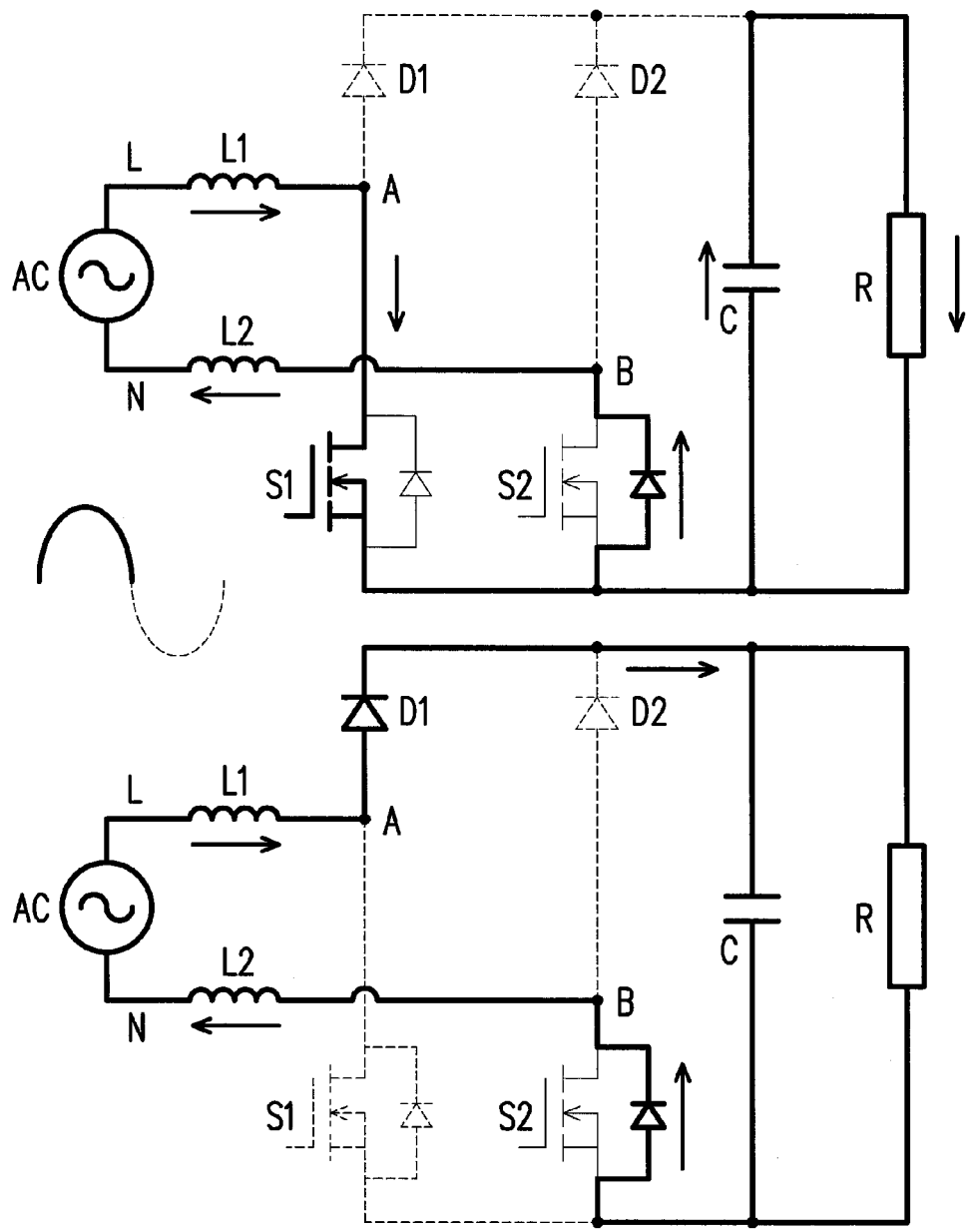
FIG. 2(a) is a schematic diagram of an operation mode of the circuit illustrated in FIG. 1 when AC input is in the positive half cycle.
Figure 2B:
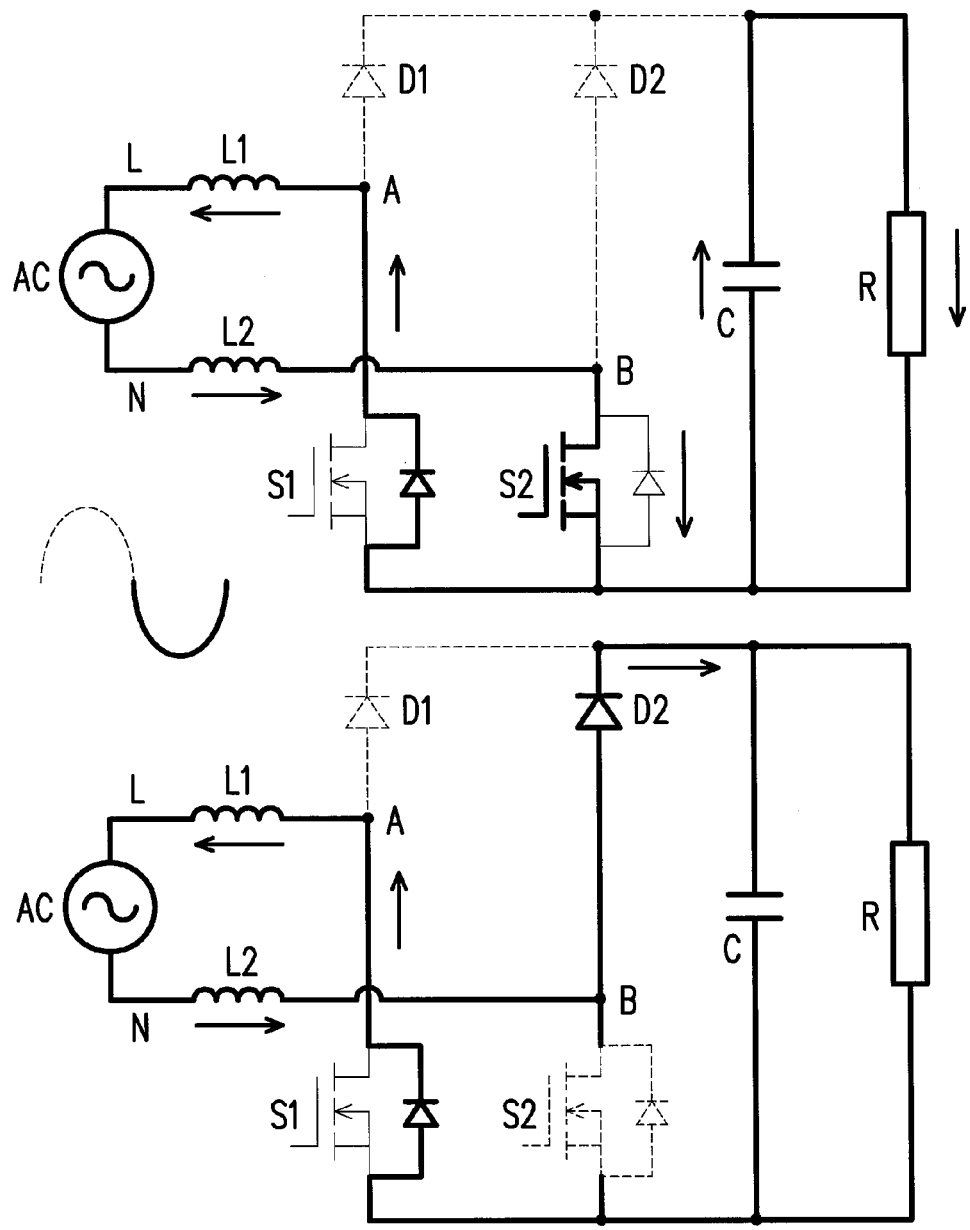
FIG. 2(b) is a schematic diagram of an operation mode of the circuit illustrated in FIG. 1 when AC input is in the negative half cycle.
Figure 3:
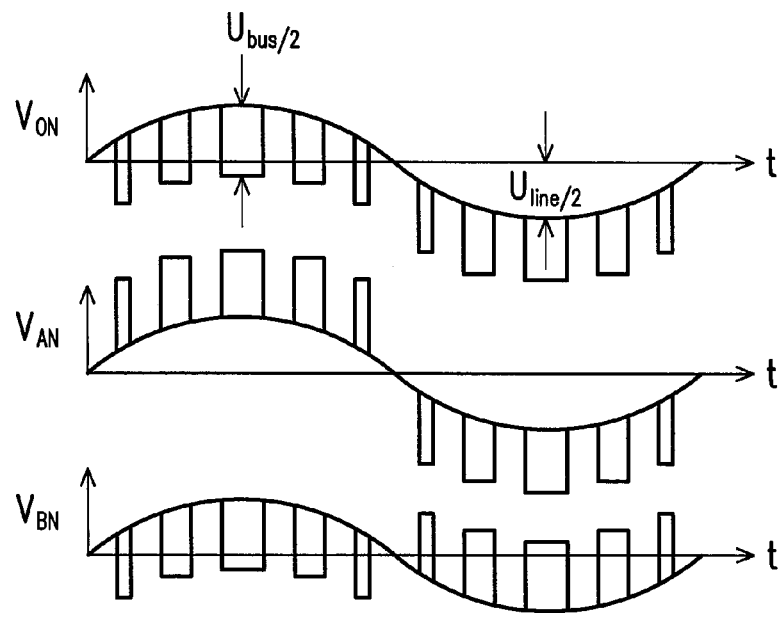
FIG. 3 illustrates voltage-waveforms of multiple nodes with respective to input ground (input neutral line) for the circuit illustrated in FIG. 1.
Figure 4:
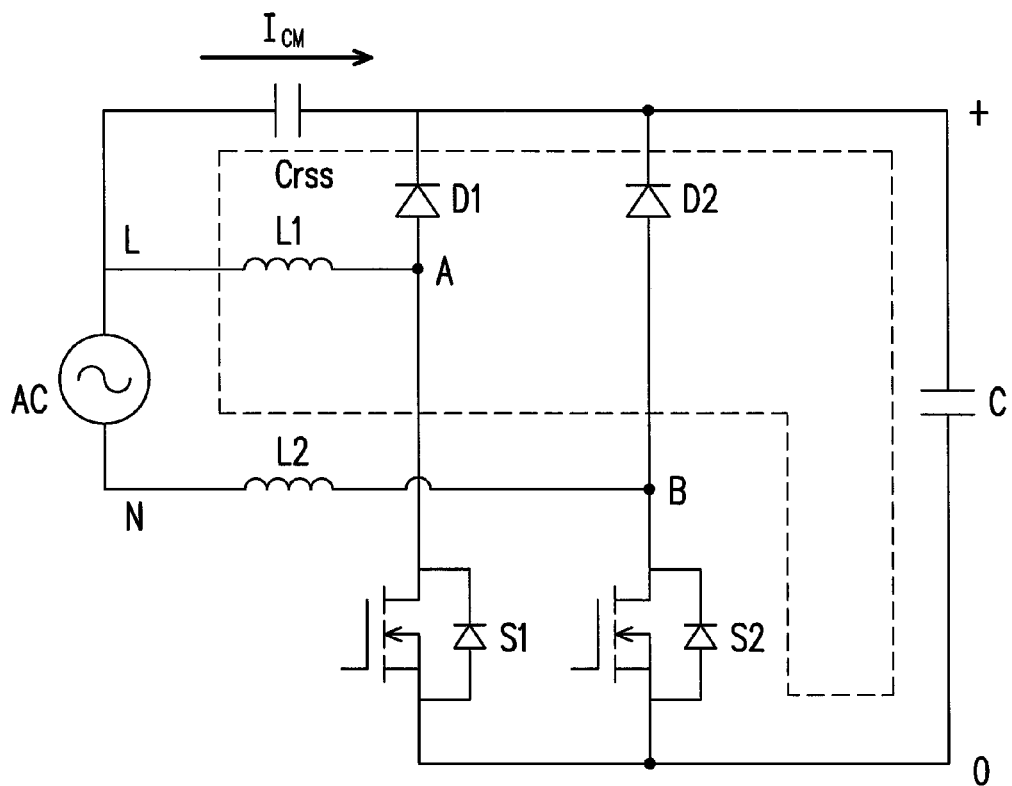
FIG. 4 is a schematic diagram of an equivalent parasitic capacitor of the circuit illustrated in FIG. 1.

Reference will now be made in detail to the present preferred embodiments of the invention, examples of which are illustrated in the accompanying drawings. Wherever possible, the same reference numbers are used in the drawings and the description to refer to the same or like parts.

Detailed descriptions of the technical strategies of the present invention will be provided with accompanying drawings.

Figure 5:
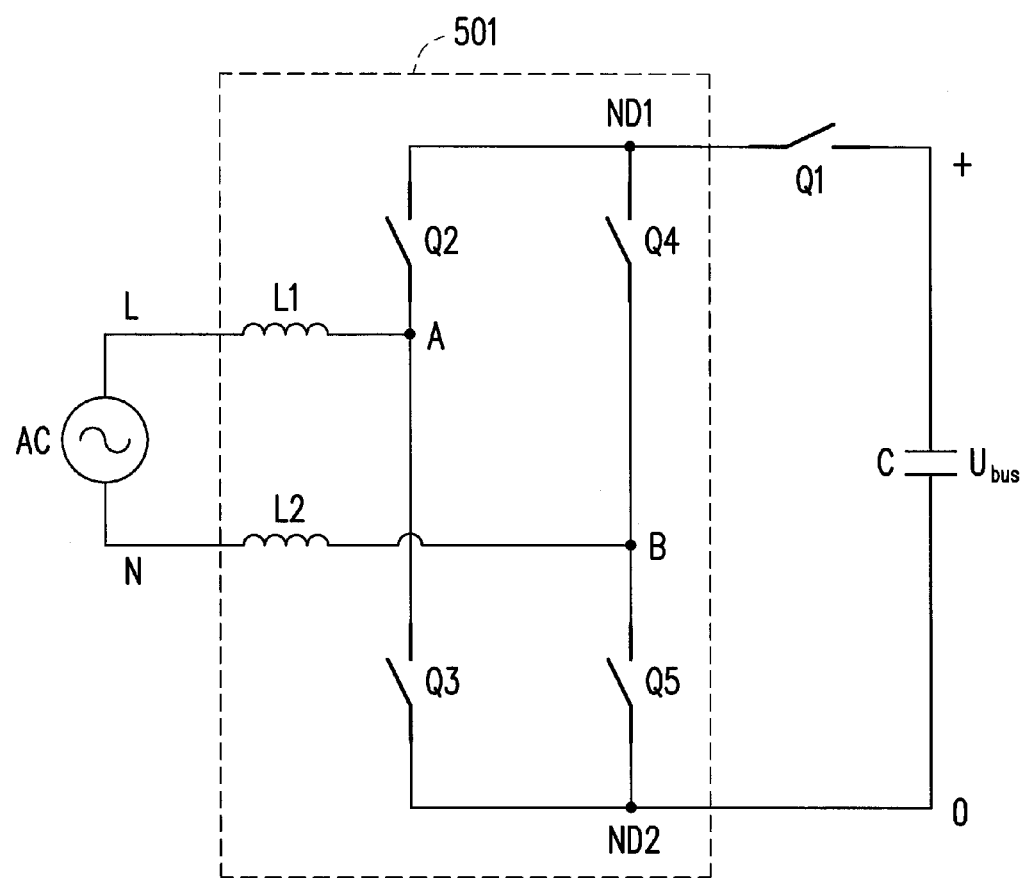
FIG. 5 is a schematic diagram of a circuit configuration according to an exemplary embodiment of the present invention.
Figure 16:
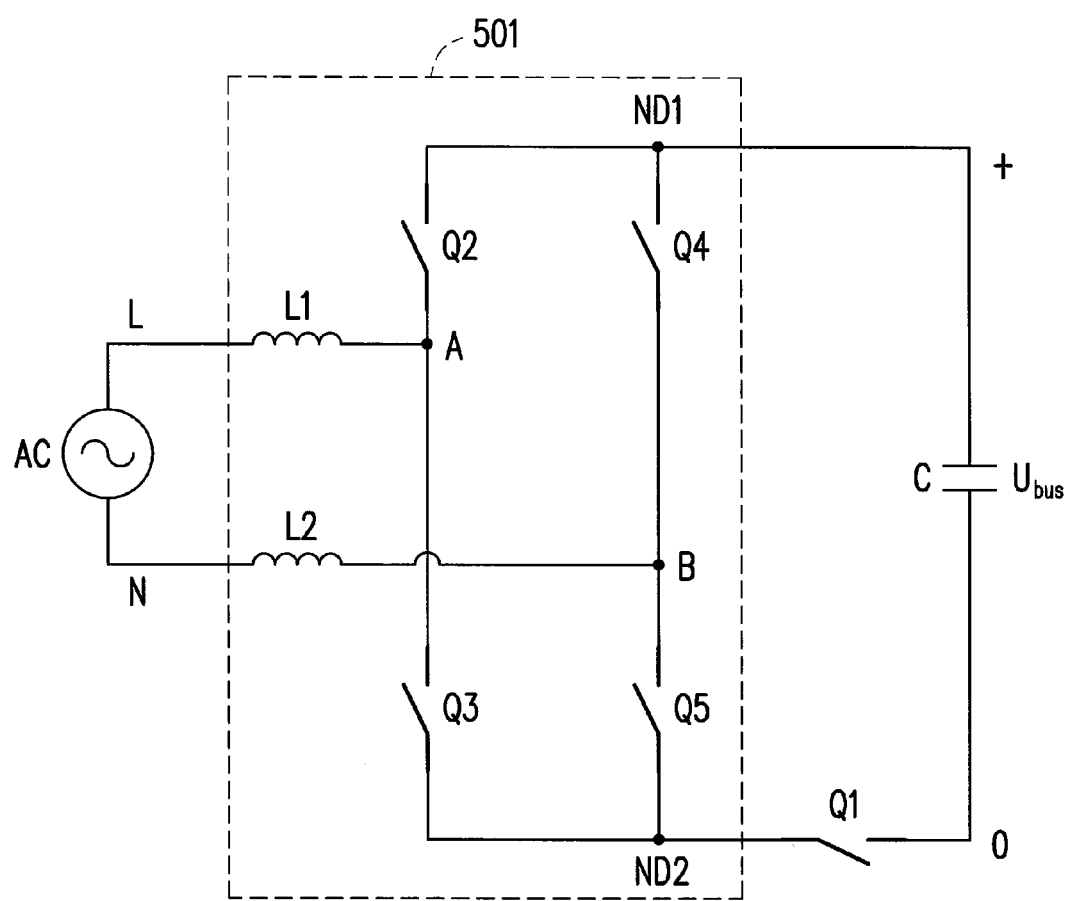
FIG. 16 is a schematic diagram of a circuit configuration according to another exemplary embodiment of the present invention.

As illustrated in FIG. 5 and FIG. 16, the present invention provides an AC-to-DC conversion apparatus. The AC-to-DC conversion apparatus includes a first switch-element Q1, an output capacitor C and a bridgeless PFC circuit 501. The bridgeless PFC circuit 501 includes a first inductor L1, a second inductor L2 and a bridge circuit constructed by second to fifth switch-elements Q2-Q5. The second switch-element Q2 and the third switch-element Q3 are connected in series to form a first series branch. The fourth switch-element Q4 and the fifth switch-element Q5 are connected in series to form a second series branch. The first and second series branches are connected in parallel.

A first terminal of the first inductor L1 is connected to a first terminal of an AC input (i.e. fire-line L, also called as L-line), and a second terminal of the first inductor L1 is connected to a common node A between the second switch-element Q2 and the third switch-element Q3. A first terminal of the second inductor L2 is connected to a second terminal of the AC input (i.e. neutral-line N, also called as N-line), and a second terminal of the second inductor L2 is connected to a common node B between the fourth switch-element Q4 and the fifth switch-element Q5.

In the exemplary embodiment, the second to fifth switch-elements Q2-Q5 can be divided into a first group of switch-elements including the second and fourth switch-elements (Q2, Q4) and a second group of switch-elements including the third and fifth switch-elements (Q3, Q5). The first group of switch-elements (Q2, Q4) are implemented by the same components (devices), for example, controllable switch-elements or diodes. Similarly, the second group of switch-elements (Q3, Q5) are implemented by the same components (devices), for example, controllable switch-elements or diodes. At least one of the first group of switch-elements (Q2, Q4) and the second group of switch-elements (Q3, Q5) may be implemented by controllable switch-elements with the same type or different types.

The first switch-element Q1 must be configured to connect between the bridgeless PFC circuit 501 and the output capacitor C. A first terminal of the first switch-element Q1 is connected to one of a common node ND1 between the second and the fourth switch-elements (Q2, Q4) and a common node ND2 between the third and the fifth switch-elements (Q3, Q5). A second terminal of the first switch-element Q1 is connected to a first terminal of the output capacitor C. A second terminal of the output capacitor C is connected to the remaining one of the common node ND1 between the second and the fourth switch-elements (Q2, Q4) and the common node ND2 between the third and the fifth switch-elements (Q3, Q5).

For example, as shown in FIG. 5, the first terminal of the first switch-element Q1 is connected to the common node ND1 between the second and the fourth switch-elements (Q2, Q4), and the second terminal of the first switch-element Q1 is connected to the common node ND2 between the third and the fifth switch-elements (Q3, Q5) through the output capacitor C. On the other hand, as shown in FIG. 16, the first terminal of the first switch-element Q1 is connected to the common node ND2 between the third and the fifth switch-elements (Q3, Q5), and the second terminal of the first switch-element Q1 is connected to the common node ND1 between the second and the fourth switch-elements (Q2, Q4) through the output capacitor C.

Herein, different implementation configurations of the present invention would be described and explained in detail.

It should be firstly noted that in the following exemplary embodiments, the first switch-element Q1 is implemented by a controllable switch-element, for example, a MOSFET. And, in order to achieve the purpose of better performance, the used MOSFET has a body diode. However, the used controllable switch-element is not limited to the MOSFET, other controllable switch-elements like relays, JFETs, etc., can also be used by the real design/application requirement.

Figure 6:
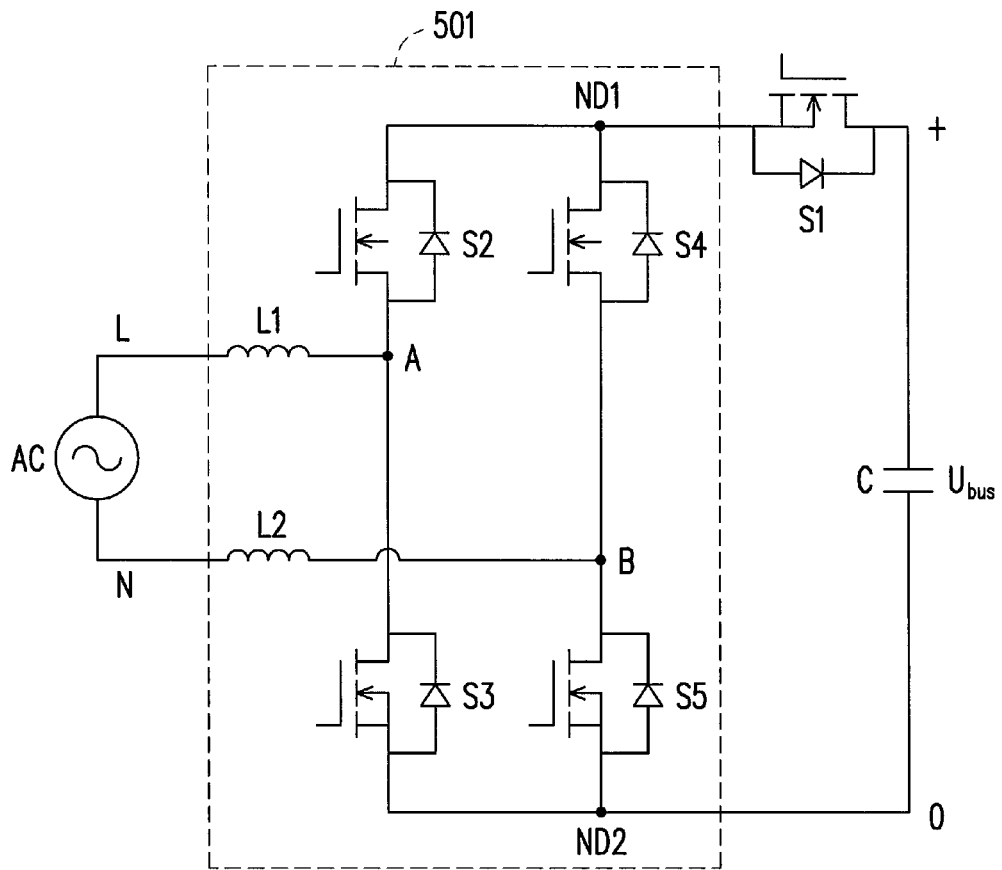
FIG. 6 is a schematic diagram of an implementation configuration according to a first exemplary embodiment of the present invention.

An implementation configuration according to a first exemplary embodiment of the present invention is shown in FIG. 6. Referring to FIGS. 5 and 6, the first switch-element Q1 is implemented by a MOSFET S1 having the body diode. The bridgeless PFC circuit 501 includes two inductors (L1, L2) and four switch-elements (Q2-Q5) respectively implemented by corresponding MOSFETs S2-S5 each having body diode, but the implemented MOSFETs without having body diodes can also be adopted regardless of performance.

A source of the MOSFET S2 is connected to a drain of the MOSFET S3, and the first series branch is formed by serially connecting the MOSFET S2 with the MOSFET S3. A source of the MOSFET S4 is connected to a drain of the MOSFET S5, and the second series branch connected in parallel with the first series branch is formed by serially connecting the MOSFET S4 with the MOSFET S5. Specifically, drains of the MOSFETs S2 and S4 are connected with each other, and sources of the MOSFETs S3 and S5 are connected with each other.

The first terminal of the inductor L1 is connected to the first terminal of the AC input (i.e. L-line), and the second terminal of the inductor L1 is connected to the common node A between the MOSFETs S2 and S3. The first terminal of the inductor L2 is connected to the second terminal of the AC input (i.e. N-line), and the second terminal of the inductor L2 is connected to the common node B between the MOSFETs S4 and S5. A source of the MOSFET S1 is connected to the common node ND1 between the MOSFETs S2 and S4 (i.e. the drains of the MOSFETs S2 and S4), and a drain of the MOSFET S1 is connected to the common node ND2 between the MOSFETs S3 and S5 (i.e. the sources of the MOSFETs S3 and S5) through the output capacitor C.

Figure 7:
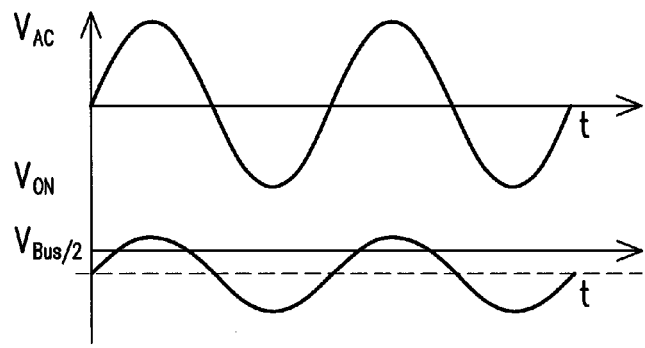
FIG. 7 illustrates waveforms corresponding to the circuit illustrated in FIG. 6.

Based on the circuit configuration as shown in FIG. 6, a suitable control manner thereof is provided. To be specific, in a positive half cycle of the AC input $V_{AC}$ (as shown in FIG. 7), the MOSFET S2 is kept at on-state, the MOSFET S4 is served as a master switch, the MOSFETs (S1, S5) are switched synchronously (i.e. turned-on at the same time, or turned-off at the same time), a switching of the MOSFET S4 is complementary to that of the MOSFETs (S1, S5), and the MOSFET S3 is kept at off-state. In a negative half cycle of the AC input $V_{AC}$, the MOSFET S4 is kept at on-state, the MOSFET S2 is served as the master switch, the MOSFETs (S1, S3) are switched synchronously (i.e. turned-on at the same time, or turned-off at the same time), a switching of the MOSFET S2 is complementary to that of the MOSFETs (S1, S3), and the MOSFET S5 is kept at off-state.

According to Kirchhoff's voltage law by referring FIG. 6's circuit topology and FIG. 7's waveforms, the following equations (1) and (2) can be obtained.

$$U_{L1}+U_{AC}+U_{NO}+U_{OA}=0 \quad (1)$$

$$U_{L2}+U_{NO}+U_{OB}=0 \quad (2)$$

The directions of the currents respectively flowing through the inductors L1 and L2 are opposite, but the parameters of the currents are the same. Therefore, $U_{L1}=-U_{L2}$. In this case, performing an addition operation on equations (1) and (2), the following equations (3) and (4) can be obtained.

$$2U_{NO} = U_{AO} + U_{BO} - U_{AC} \quad (3)$$

$$U_{NO} = \frac{U_{AO} + U_{BO}}{2} - \frac{U_{AC}}{2} \quad (4)$$

wherein $U_{AC}$ is the AC power-frequency input voltage, hence as long as $(U_{AO}+U_{BO})$ does not contain high frequency components, $U_{NO}$ will not contain high frequency components.

Each operation mode in FIG. 6's circuit topology will be described as below.

Figure 8:
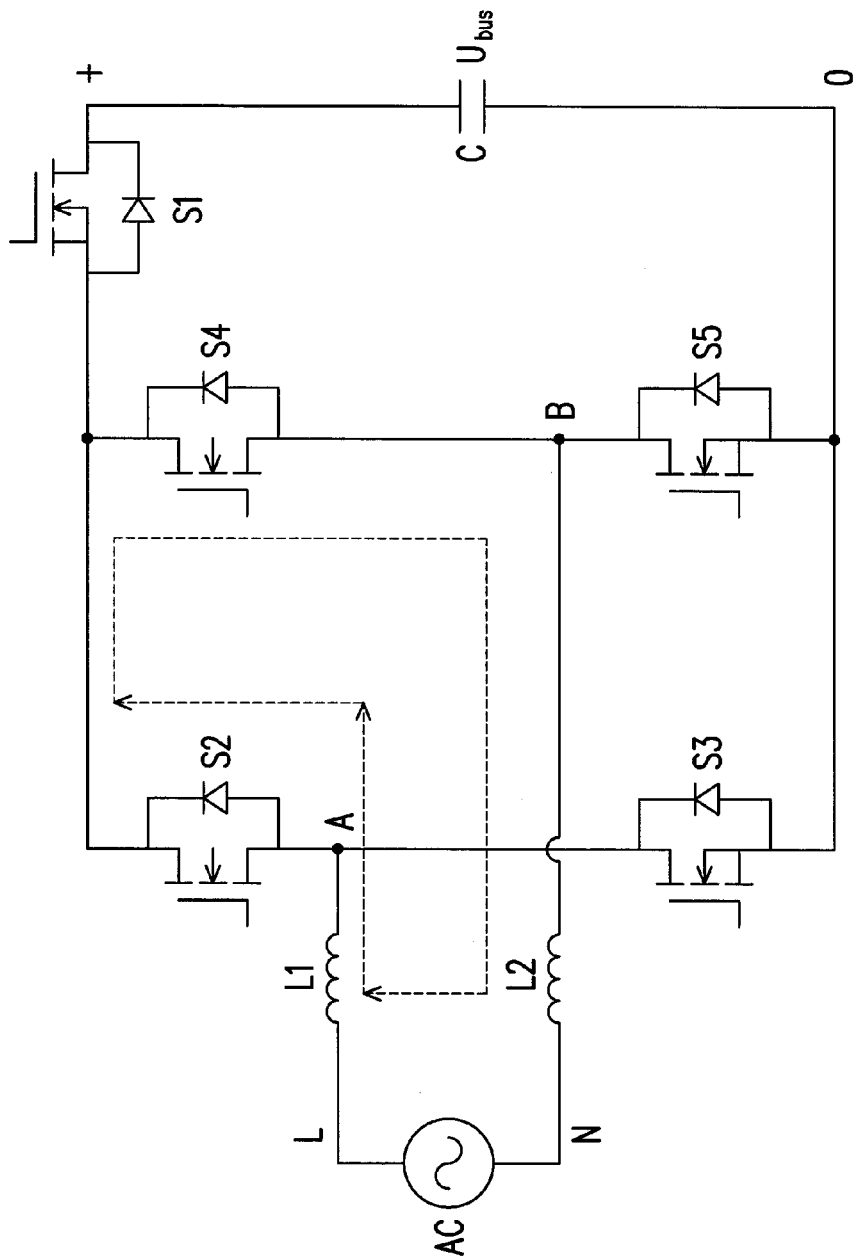
FIG. 8 is a schematic diagram of an operation mode of the circuit illustrated in FIG. 6 when AC input is in the positive half cycle.

1. In the positive half cycle of the AC input $V_{AC}$, the MOSFET S2 is kept at on-state, and the MOSFET S3 is kept at off-state. Assuming that the MOSFET S4 is in on-state at this time, the MOSFETs S1 and S5 are both in off-state. Since the characteristics of the MOSFETs S1 and S5 are the same, so referring to FIG. 8, the following equation (5) can be obtained.

$$U_{AO}+U_{BO}=-U_{S1}+U_{Bus}+U_{S5}=U_{Bus} \quad (5)$$

Figure 9:
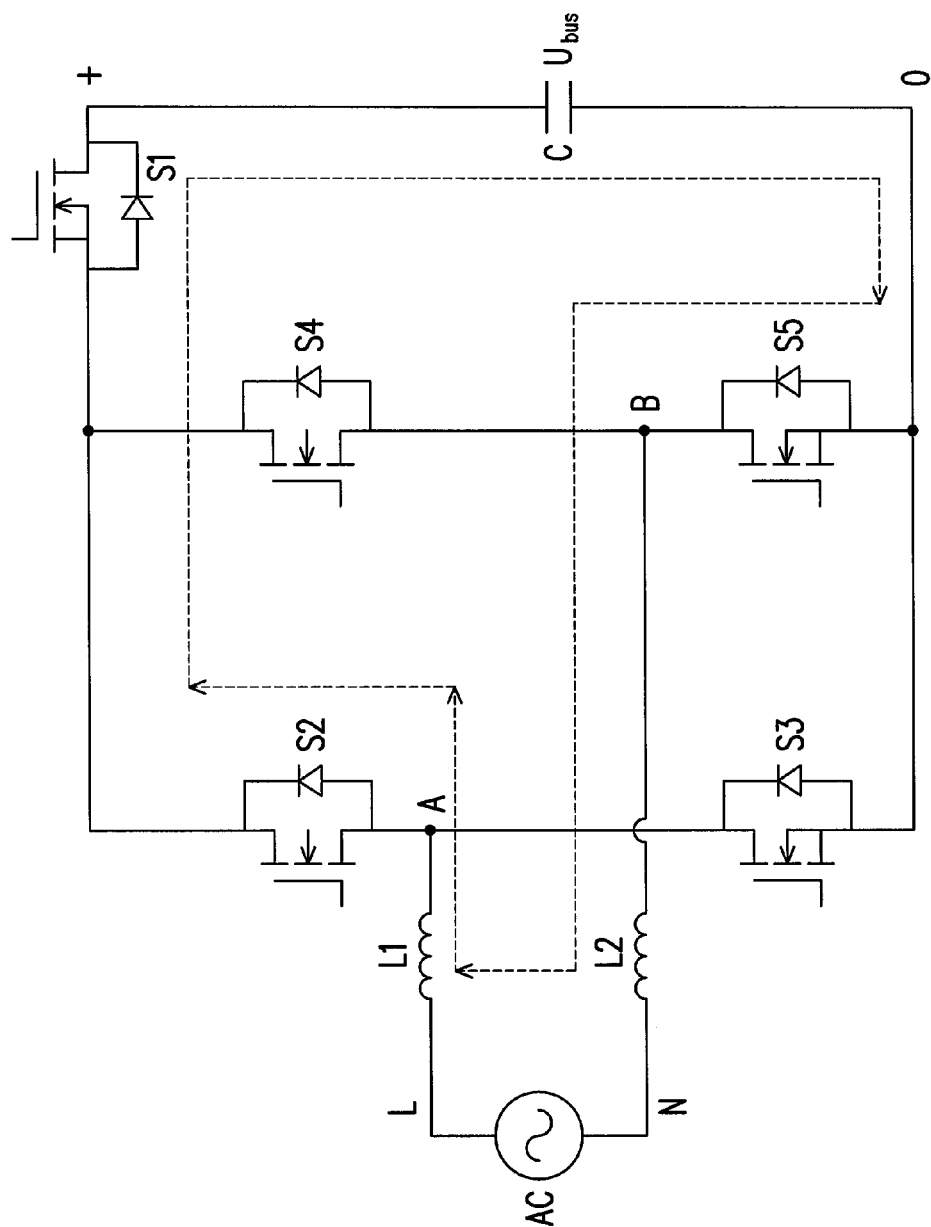
FIG. 9 is a schematic diagram of another operation mode of the circuit illustrated in FIG. 6 when AC input is in the positive half cycle.

2. In the positive half cycle of the AC input $V_{AC}$, the MOSFET S2 is kept at on-state, and the MOSFET S3 is kept at off-state. Assuming that the MOSFET S4 is in off-state at this time, the MOSFETs S1 and S5 are both in on-state, so referring to FIG. 9, since the MOSFET S5 is in on-state, so $U_{BO}=0$ (the conduction voltage drop is neglected herein). In addition, since the MOSFET S2 is in on-state and the MOSFET S1 is in on-state, so $U_{AO}=U_{Bus}$, such that the following equation (6) can be obtained.

$$U_{AO}+U_{BO}=U_{Bus}+0=U_{Bus} \quad (6)$$

Figure 10:
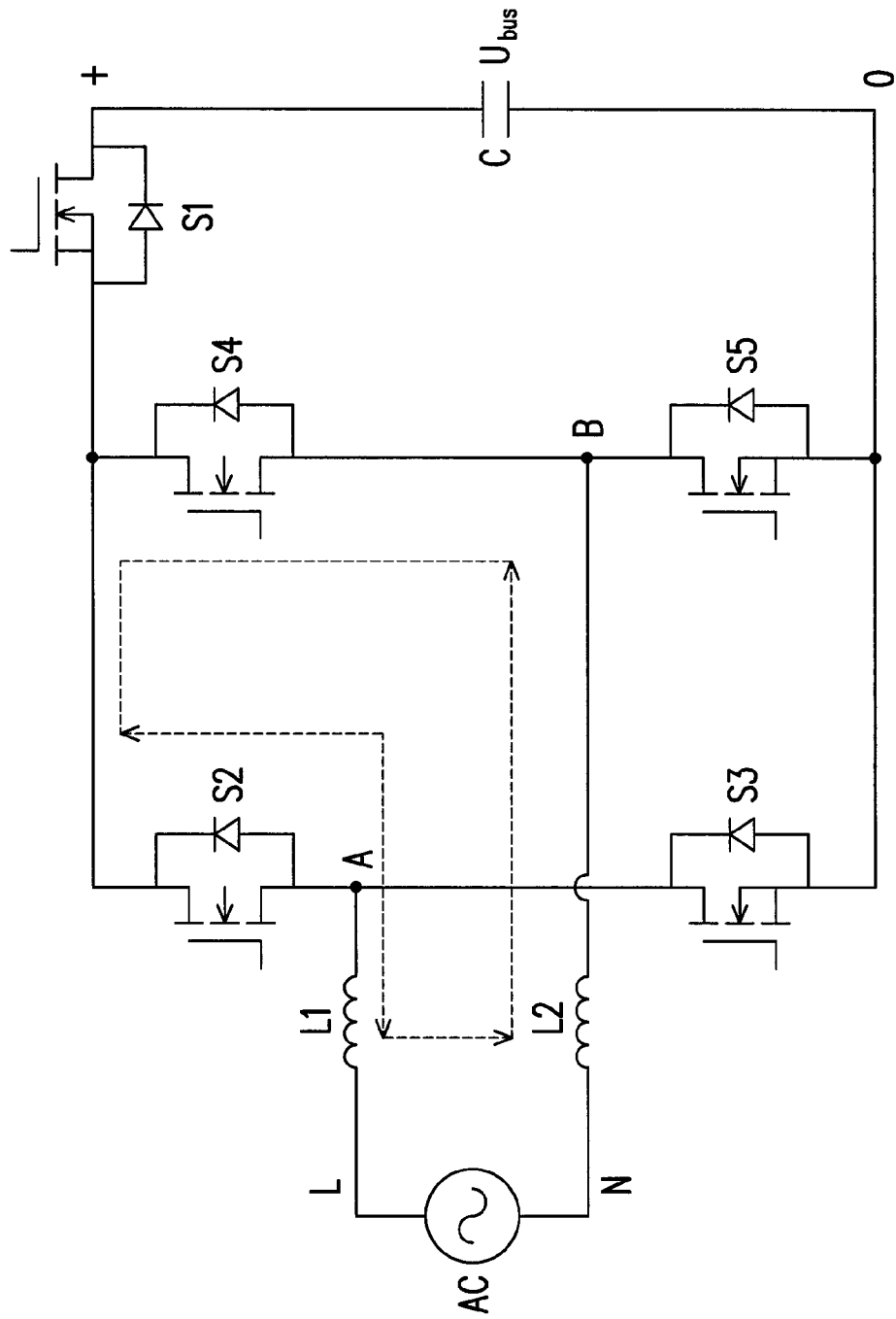
FIG. 10 is a schematic diagram of an operation mode of the circuit illustrated in FIG. 6 when AC input is in the negative half cycle.

3. In the negative half cycle of AC input $V_{AC}$, the MOSFET S4 is kept at on-state, and the MOSFET S5 is kept at off-state. Assuming that the MOSFET S2 is in on-state at this time, the MOSFET S1 and S3 are both in off-state. Since the characteristics of the MOSFETs S1 and S5 are the same, so referring to FIG. 10 (whose operation mode is the same as in FIG. 8), the following equation (7) can be obtained.

$$U_{AO}+U_{BO}=-U_{S1}+U_{Bus}+U_{S5}=U_{Bus} \quad (7)$$

Figure 11:
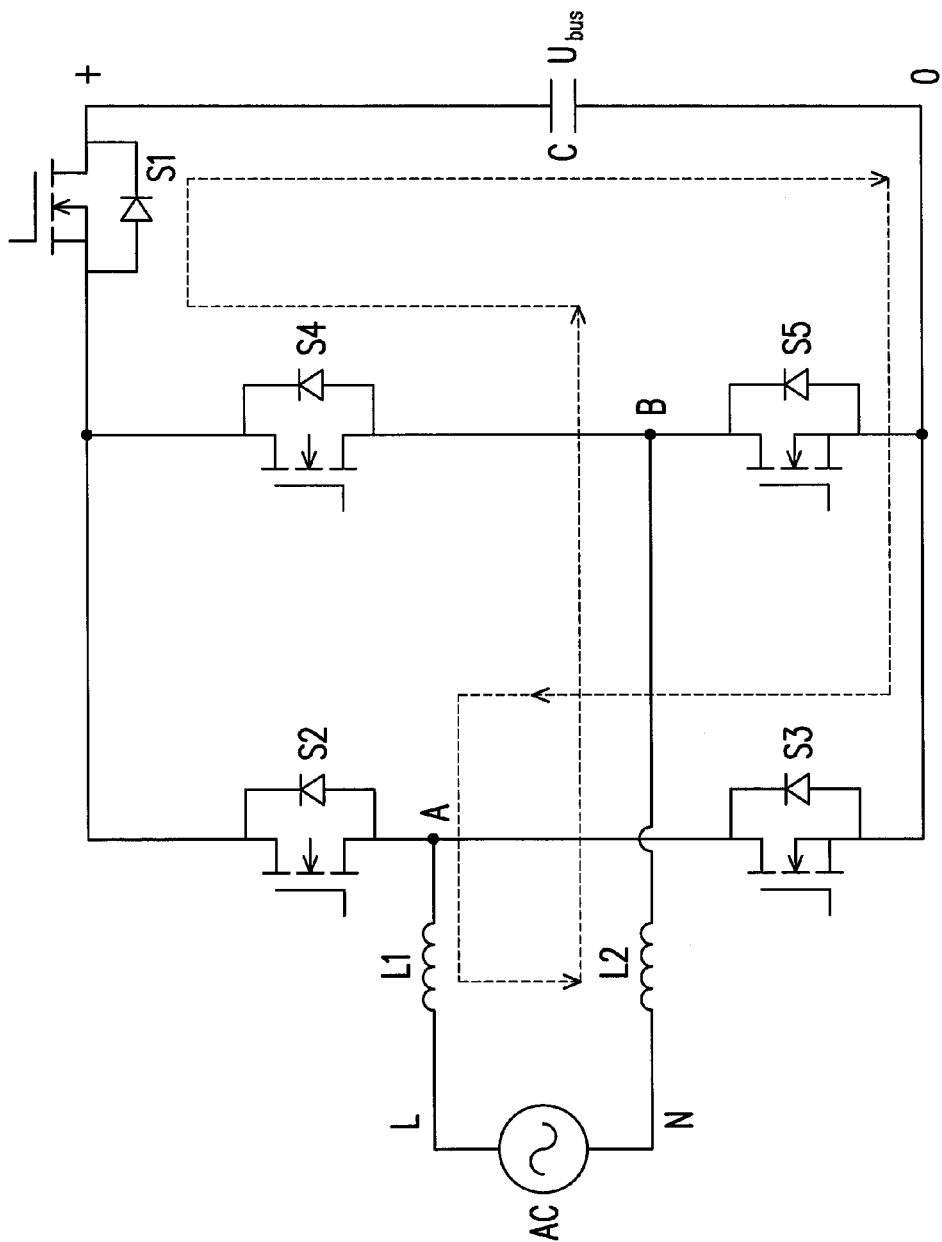
FIG. 11 is a schematic diagram of another operation mode of the circuit illustrated in FIG. 6 when AC input is in the negative half cycle.

4. In the negative half cycle of the AC input $V_{AC}$, the MOSFET S4 is kept at on-state, and the MOSFET S5 is kept at off-state. Assuming that the MOSFET S2 is off-state at this time, the MOSFET S1 and S3 are both in on-state, so referring to FIG. 11, since the MOSFET S3 is in on-state, so $U_{AO}=0$ (the conduction voltage drop is neglected). In addition, since the MOSFET S4 is in on-state and the MOSFET S1 is in on-state, so $U_{BO}=U_{Bus}$, such that the following equation (8) can be obtained.

$$U_{AO}+U_{BO}=0+U_{Bus}=U_{Bus} \quad (8)$$

In summary, in the circuit topology illustrated in FIG. 6, a result of $U_{AO}+U_{BO}=U_{Bus}$ can be obtained.

Figure 17:
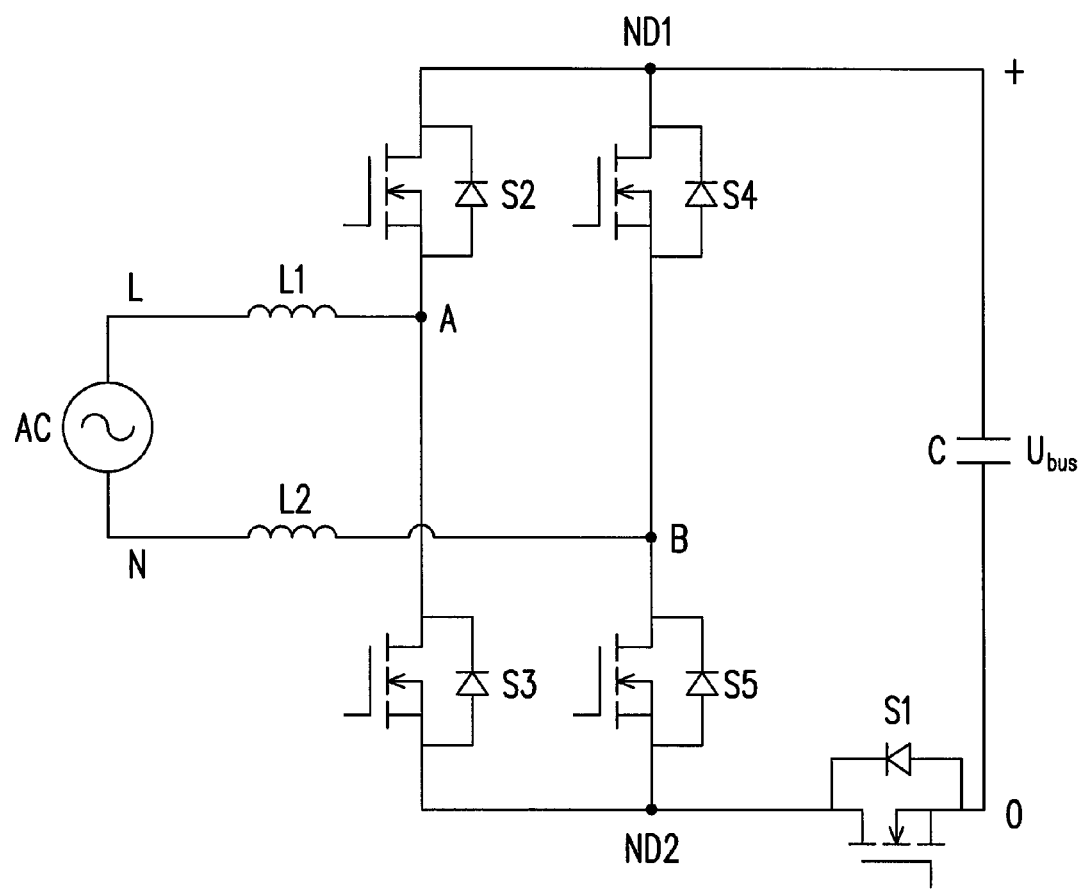
FIG. 17 is another circuit configuration of the first exemplary embodiment of the present invention.

Compared with the aforementioned exemplary embodiment, FIG. 17 is another circuit configuration of the first exemplary embodiment of the present invention. Referring to FIG. 17, the drain of the MOSFET S1 is connected to the common node ND2 between the MOSFETs (S3, S5), and the source of the MOSFET S1 is connected to the common node ND1 between the MOSFETs (S2, S4) through the output capacitor C. In this case, as shown in FIG. 17's circuit configuration, a suitable control manner thereof is provided.

To be specific, in the positive half cycle of the AC input ($V_{AC}$), the MOSFET S3 is kept at an on-state, the MOSFET S5 is served as a master switch, the MOSFETs (S1, S4) are switched synchronously, a switching of the MOSFET S5 is complementary to that of the MOSFETs (S1, S4), and the MOSFET S2 is kept at an off-state. In the negative half cycle of the AC input ($V_{AC}$), the MOSFET S5 is kept at the on-state, the MOSFET S3 is served as the master switch, the MOSFETs (S1, S2) are switched synchronously, a switching of the MOSFET S3 is complementary to that of the MOSFETs (S1, S2), and the MOSFET S4 is kept at the off-state.

Figure 12:
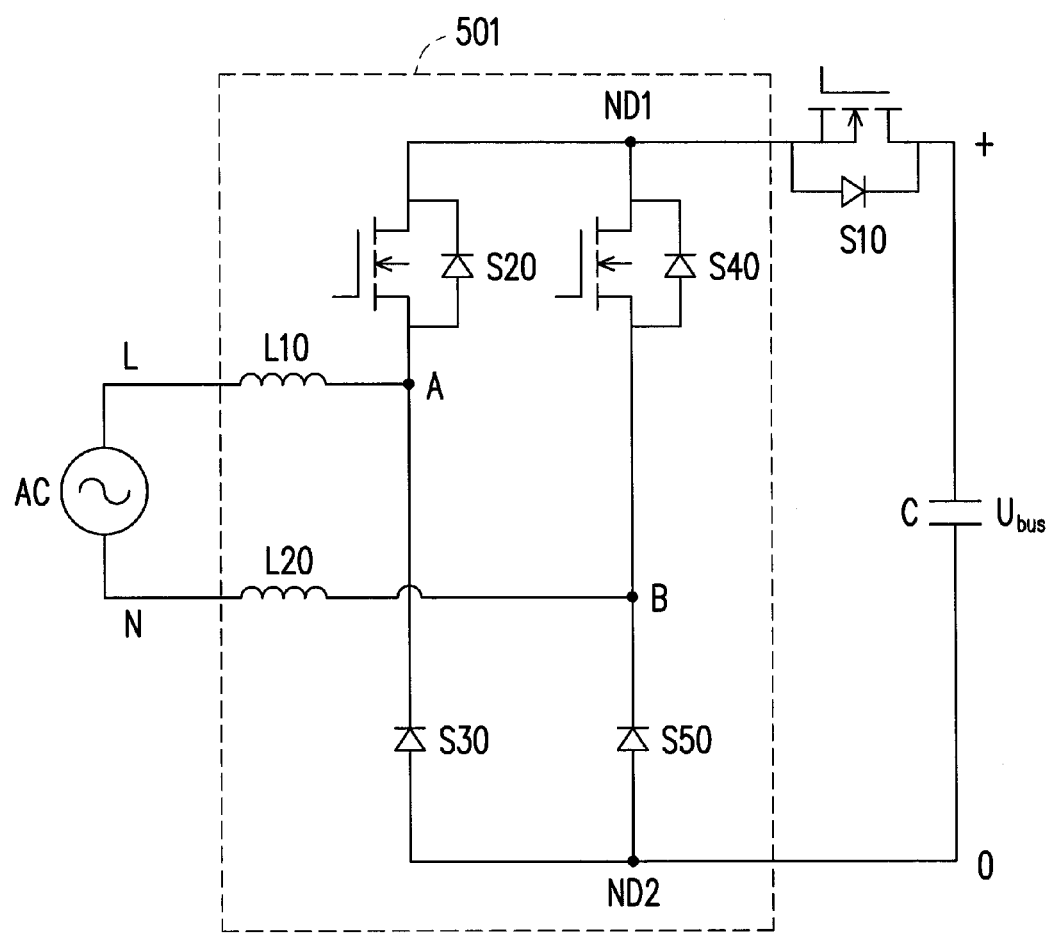
FIG. 12 is a schematic diagram of an implementation configuration according to a second exemplary embodiment of the present invention.

FIG. 12 is a schematic diagram of an implementation configuration according to a second exemplary embodiment of the present invention. Referring to FIGS. 5 and 12, the first switch-element Q1 is implemented by a MOSFET S10 having the body diode. The bridgeless PFC circuit 501 includes two inductors (L10, L20), two first-type switch-elements (Q2, Q4) respectively implemented by corresponding MOSFETs (S20, S40) each having body diode, and two second-type switch-elements (Q3, Q5) respectively implemented by corresponding diodes (S30, S50). Similarly, the implemented MOSFETs without having body diodes can also be adopted regardless of performance.

A source of the MOSFET S20 is connected to a cathode of the diode S30, and the first series branch is formed by serially connecting the MOSFET S20 with the diode S30. A source of the MOSFET S40 is connected to a cathode of the diode S50, and the second series branch connected in parallel with the first series branch is formed by serially connecting the MOSFET S40 with the diode S50. Specifically, drains of the MOSFETs S20 and S40 are connected with each other, and anodes of the diodes S30 and S50 are connected with each other.

A first terminal of the inductor L10 is connected to the first terminal of the AC input (i.e. L-line), and a second terminal of the inductor L10 is connected to the common node A between the MOSFET S20 and the diode S30. A first terminal of the inductor L20 is connected to the second terminal of the AC input (i.e. N-line), and a second terminal of the inductor L20 is connected to the common node B between the MOSFET S40 and the diode S50. A source of the MOSFET S10 is connected to the common node ND1 between the MOSFETs S20 and S40 (i.e. the drains of the MOSFETs S20 and S40), and a drain of the MOSFET S10 is connected to the common node ND2 between the diodes S30 and S50 (i.e. the anodes of the diodes S30 and S50) through the output capacitor C.

Based on the circuit configuration as shown in FIG. 12, a suitable control manner thereof is provided. To be specific, in the positive half cycle of the AC input ($V_{AC}$), the MOSFET S20 is kept at on-state, the MOSFET S40 is served as a master switch, and a switching of the MOSFET S10 is complementary to that of the MOSFET S40. In the negative half cycle of the AC input ($V_{AC}$), the MOSFET S40 is kept at on-state, the MOSFET S20 is served as the master switch, and the switching of the MOSFET S10 is complementary to that of the MOSFET S20.

Figure 13:
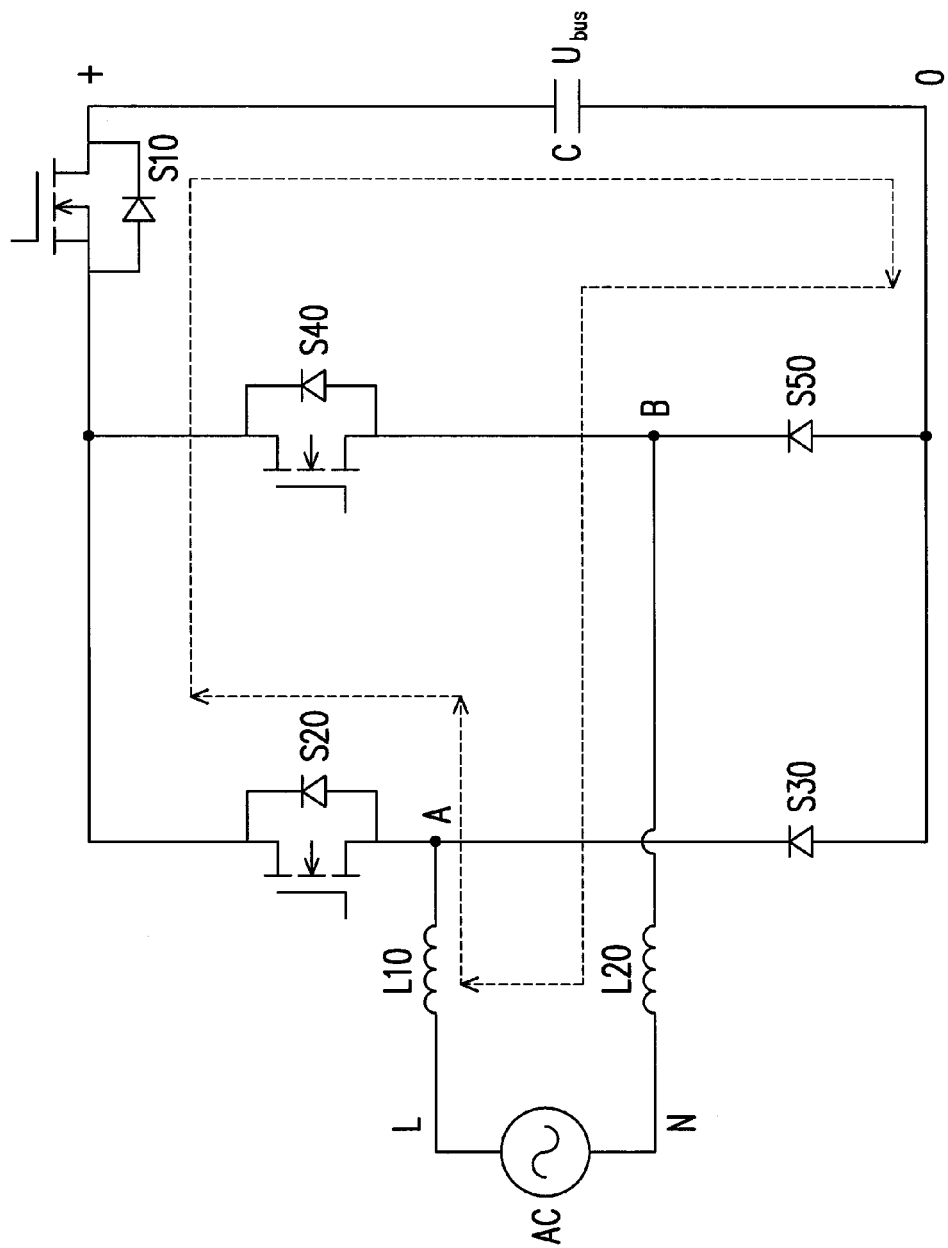
FIG. 13 is a schematic diagram of an operation mode of the circuit illustrated in FIG. 12 when AC input is in the positive half cycle.
Figure 14:
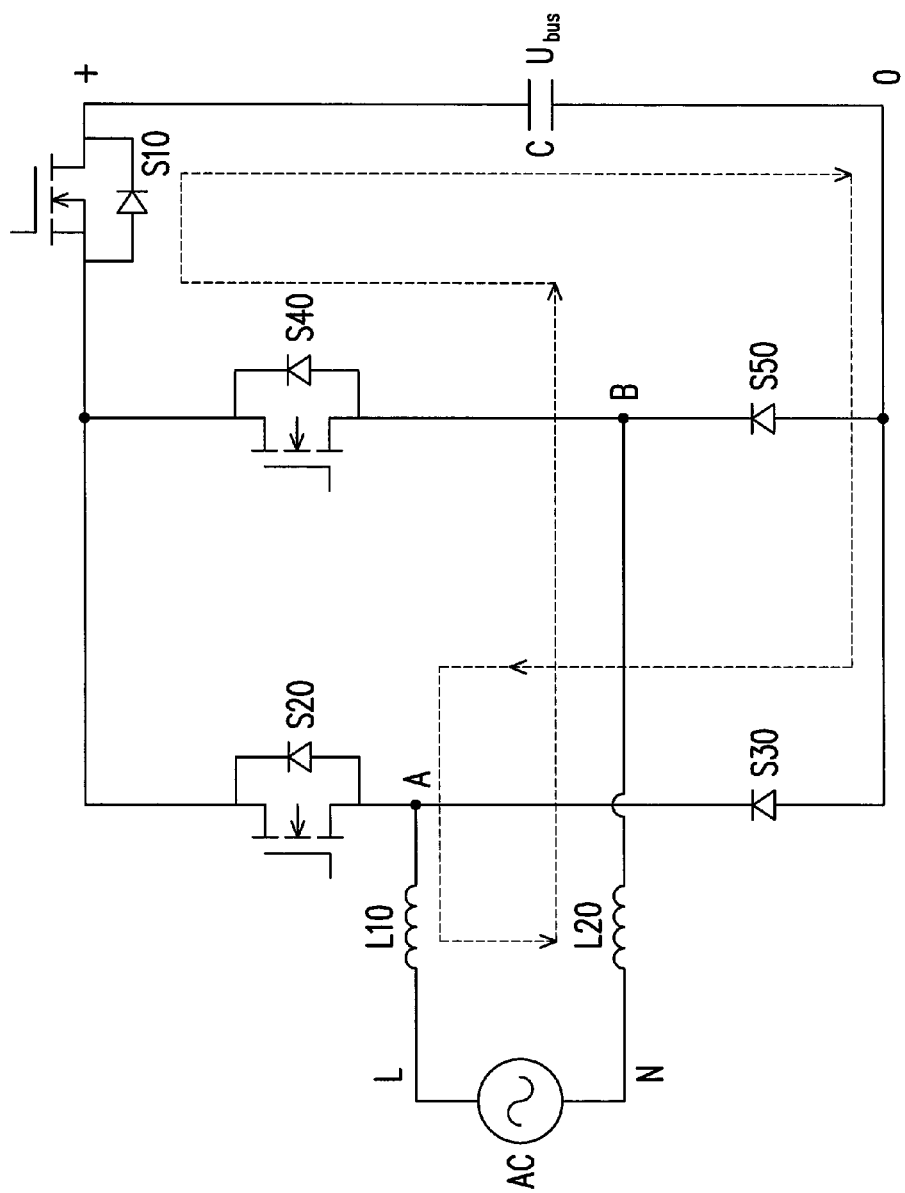
FIG. 14 is a schematic diagram of an operation mode of the circuit illustrated in FIG. 12 when AC input is in the negative half cycle.

As shown in FIG. 13, in the positive half cycle of the AC input ($V_{AC}$), the MOSFET S20 is kept at on-state, assuming that the MOSFET S40 is in off-state at this time, the MOSFET S10 is in on-state, such that the diode S50 is served as a freewheel diode for freewheeling. On the other hand, as shown in FIG. 14, in the negative half cycle of the AC input ($V_{AC}$), the MOSFET S40 is kept at on-state, assuming that the MOSFET S20 is in off-state at this time, the MOSFET S10 is in on-state, such that the diode S30 is served as a freewheel diode for freewheeling. The other two operation modes relating to FIG. 12's circuit topology can be inferred/analogized by referring to the explanations of the above exemplary embodiments, so the details would be omitted.

Figure 15:
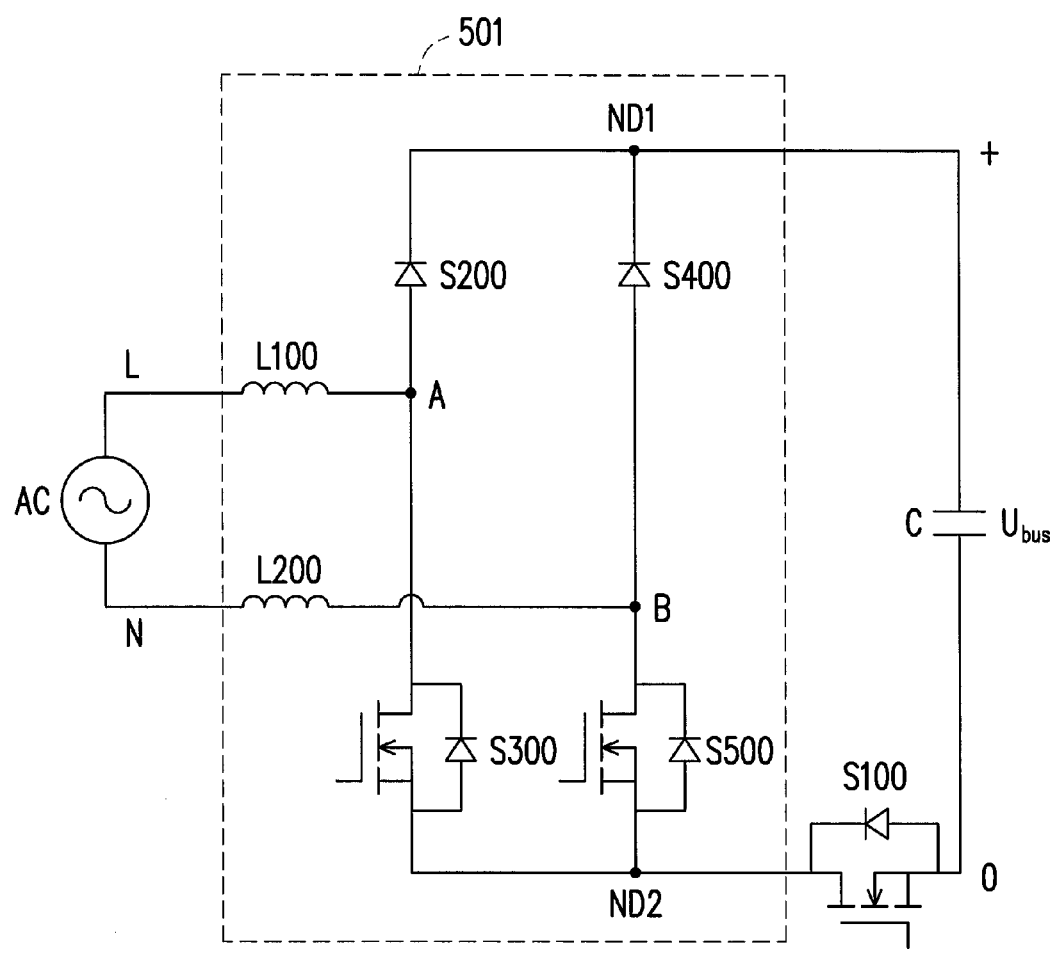
FIG. 15 is a schematic diagram of an implementation configuration according to a third exemplary embodiment of the present invention.

FIG. 15 is a schematic diagram of an implementation configuration according to a third exemplary embodiment of the present invention. Referring to FIGS. 15 and 16, the first switch-element Q1 is implemented by a MOSFET S100 having the body diode. The bridgeless PFC circuit 501 includes two inductors (L100, L200), two first-type switch-elements (Q2, Q4) respectively implemented by corresponding diodes (S200, S400), and two second-type switch-elements (Q3, Q5) respectively implemented by corresponding MOSFETs (S300, S500) each having body diode. Similarly, the implemented MOSFETs without having body diodes can also be adopted regardless of performance.

An anode of the diode S200 is connected to a drain of the MOSFET S300, and the first series branch is formed by serially connecting the diode S200 with the MOSFET S300. An anode of the diode S400 is connected to a drain of the MOSFET S500, and the second series branch connected in parallel with the first series branch is formed by serially connecting the diode S400 with the MOSFET S500. Specifically, cathodes of the diodes S200 and S400 are connected with each other, and sources of the MOSFETs S300 and S500 are connected with each other.

A first terminal of the inductor L100 is connected to the first terminal of the AC input (i.e. L-line), and a second terminal of the inductor L100 is connected to the common node A between the diode S200 and the MOSFET S300. A first terminal of the inductor L200 is connected to the second terminal of the AC input (i.e. N-line), and a second terminal of the inductor L200 is connected to the common node B between the diode S400 and the MOSFET S500. A source of the MOSFET S100 is connected to the common node ND1 between the diodes S200 and S400 (i.e. the cathodes of the diodes S200 and S400) through the output capacitor C, and a drain of the MOSFET S100 is connected to the common node ND2 between the MOSFETs S300 and S500 (i.e. the sources of the MOSFETs S300 and S500).

Based on the circuit configuration as shown in FIG. 15, a suitable control manner thereof is provided. To be specific, in the positive half cycle of the AC input ($V_{AC}$), the MOSFET S300 is kept at on-state, the MOSFET S500 is served as a master switch, and a switching of the MOSFET S100 is complementary to that of the MOSFET S500. In the negative half cycle of the AC input ($V_{AC}$), the MOSFET S500 is kept at on-state, the MOSFET S300 is served as the master switch, and the switching of the MOSFET S100 is complementary to that of the MOSFET S300.

Figure 18:
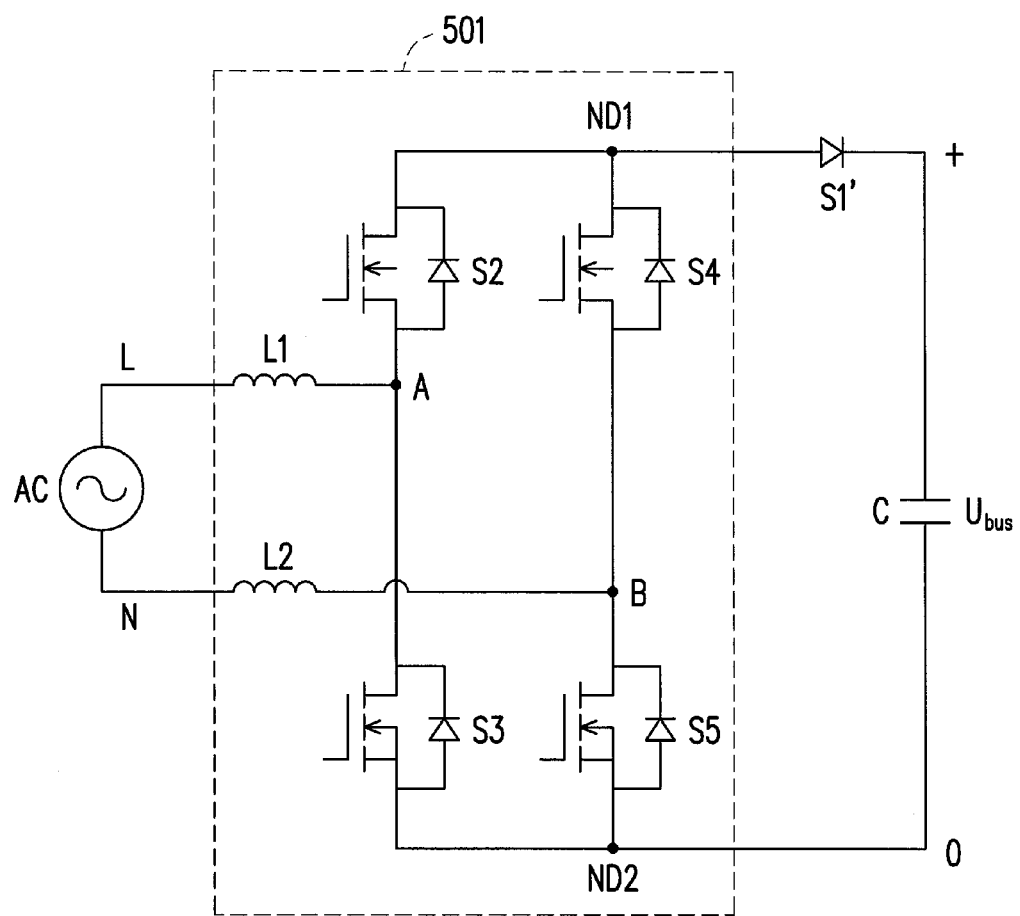
FIG. 18 is another circuit implementation configuration of the first exemplary embodiment of the present invention.

FIG. 18 is another circuit implementation configuration of the first exemplary embodiment of the present invention. Referring to FIGS. 5 and 18, the first switch-element Q1 is implemented by a diode S1'. The bridgeless PFC circuit 501 as shown in FIG. 18 is the same as that of FIG. 6, so the connections thereof are omitted. As shown in FIG. 18, an anode of the diode S1' is connected to the common node ND1 between the MOSFETs S2 and S4 (i.e. the drains of the MOSFETs S2 and S4), and a cathode of the diode S1' is connected to the common node ND2 between the MOSFETs S3 and S5 (i.e. the sources of the MOSFETs S3 and S5) through the output capacitor C.

Figure 19:
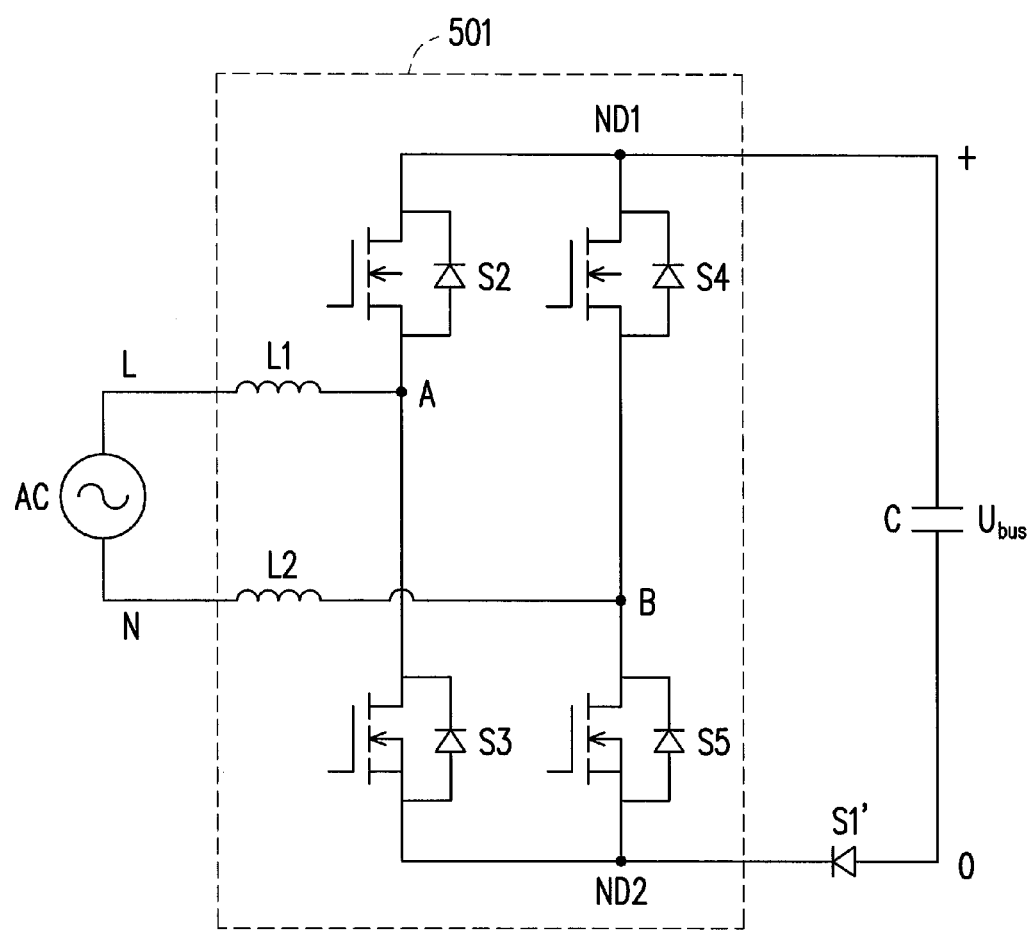
FIG. 19 is yet another circuit implementation configuration of the first exemplary embodiment of the present invention.

FIG. 19 is yet another circuit implementation configuration of the first exemplary embodiment of the present invention. Referring to FIGS. 16 and 19, the first switch-element Q1 is implemented by a diode S1'. The bridgeless PFC circuit 501 as shown in FIG. 19 is the same as that of FIG. 6, so the connections thereof are omitted. As shown in FIG. 19, an anode of the diode S1' is connected to the common node ND1 between the MOSFETs S2 and S4 (i.e. the drains of the MOSFETs S2 and S4) through the output capacitor C, and a cathode of the diode S1' is connected to the common node ND2 between the MOSFETs S3 and S5 (i.e. the sources of the MOSFETs S3 and S5).

Herein, the operations of the circuit topologies as shown in the respective FIGS. 18 and 19 are similar to that of the above exemplary embodiments relating to the first to third implementation exemplary embodiments, so the details would be omitted.

It should be noted that, in the above exemplary embodiments provided in the present invention, although all of the switch-elements take MOSFETs with body diodes and diodes as examples, the real applications are not limited by two aforementioned types. For example, other types of controllable switch-elements like triodes, JFETs, etc., can also be implemented by real design/application requirement.

It will be apparent to those skilled in the art that various modifications and variations can be made to the structure of the invention without departing from the scope or spirit of the invention.

In view of the foregoing, it is intended that the invention cover modifications and variations of this invention provided they fall within the scope of the following claims and their equivalents.

What is claimed is:

1. An AC-to-DC conversion apparatus, comprising:
a first switch-element; an output capacitor; and a bridgeless power factor correction (PFC) circuit, wherein the bridgeless PFC circuit comprising:
a bridge circuit comprising second to fifth switch-elements, wherein the second and the third switch-elements are connected in series to faun a first series branch, the fourth and the fifth switch-element are connected in series to form a second series branch, and the first series branch and the second series branch are connected in parallel;
a first inductor, having a first terminal connected to a first terminal of an AC input and a second terminal connected to a common node between the second and the third switch-elements; and
a second inductor, having a first terminal connected to a second terminal of the AC input and a second terminal connected to a common node between the fourth and the fifth switch-elements,
wherein a first group of switch-elements comprise the second and the fourth switch-elements, and are implemented by controllable switch-elements or diodes,
wherein a second group of switch-elements comprise the third and the fifth switch-elements, and are implemented by controllable switch-elements or diodes,
wherein at least one of the first group of switch-elements and the second group of switch-elements are implemented by controllable switch-elements,
wherein a first terminal of the first switch-element is connected to one of a common node between the second and the fourth switch-elements and a common node between the third and the fifth switch-elements,
wherein a second terminal of the first switch-element is connected to a first terminal of the output capacitor,
wherein a second terminal of the output capacitor is connected to the remaining one of the common node between the second and the fourth switch-elements and the common node between the third and the fifth switch-elements,
wherein when the first terminal of the first switch-element is connected to the common node between the second and the fourth switch-elements, a switching of the fourth switch-element is complementary to that of the first switch-element in a positive half cycle of the AC input, and a switching of the second switch-element is complementary to that of the first switch-element in a negative half cycle of the AC input,
wherein when the first terminal of the first switch-element is connected to the common node between the third and the fifth switch-elements, a switching of the fifth switch-element is complementary to that of the first switch-element in the positive half cycle of the AC input, and a switching of the third switch-element is complementary to that of the first switch-element in the negative half cycle of the AC input.

2. The AC-to-DC conversion apparatus according to claim 1, wherein the first switch-element, the first group of switch-elements and the second group of switch-elements are implemented by controllable switch-elements and the controllable switch-elements are MOSFETs,
wherein the first switch-element is a first MOSFET, the second switch-element is a second MOSFET, the third switch-element is a third MOSFET, the fourth switch-element is a fourth MOSFET, and the fifth switch-element is a fifth MOSFET,
wherein a source of the second MOSFET is connected to a drain of the third MOSFET, a source of the fourth MOSFET is connected to a drain of the fifth MOSFET, a drain of the second MOSFET is connected to a drain of the fourth MOSFET, and a source of the third MOSFET is connected to a source of the fifth MOSFET.

3. The AC-to-DC conversion apparatus according to claim 2, wherein a source of the first MOSFET is connected to the drains of the second and the fourth MOSFETs, and a drain of the first MOSFET is connected to the sources of the third and the fifth MOSFETs through the output capacitor.

4. The AC-to-DC conversion apparatus according to claim 3, wherein:
in a positive half cycle of the AC input, the second MOSFET is kept at an on-state, the fourth MOSFET is served as a master switch, the first and the fifth MOSFETs are switched synchronously, and the third MOSFET is kept at an off-state,
in a negative half cycle of the AC input, the fourth MOSFET is kept at the on-state, the second MOSFET is served as the master switch, the first and the third MOSFETs are switched synchronously, and the fifth MOSFET is kept at the off-state.

5. The AC-to-DC conversion apparatus according to claim 2, wherein a source of the first MOSFET is connected to the drains of the second and the fourth MOSFETs through the output capacitor, and a drain of the first MOSFET is connected to the sources of the third and the fifth MOSFETs.

6. The AC-to-DC conversion apparatus according to claim 5, wherein:
in a positive half cycle of the AC input, the third MOSFET is kept at an on-state, the fifth MOSFET is served as a master switch, the first and the fourth MOSFETs are switched synchronously, and the second MOSFET is kept at an off-state, in a negative half cycle of the AC input, the fifth MOSFET is kept at the on-state, the third MOSFET is served as the master switch, the first and the second MOSFETs are switched synchronously, and the fourth MOSFET is kept at the off-state.

7. The AC-to-DC conversion apparatus according to claim 1, wherein the first switch-element and the first group of switch-elements are implemented by controllable switch-elements and the controllable switch-elements are MOSFETs, wherein the second group of switch-elements are implemented by diodes, wherein the first switch-element is a first MOSFET, the second switch-element is a second MOSFET, the third switch-element is a third diode, the fourth switch-element is a fourth MOSFET, and the fifth switch-element is a fifth diode, wherein a source of the second MOSFET is connected to a cathode of the third diode, a source of the fourth MOSFET is connected to a cathode of the fifth diode, a drain of the second MOSFET is connected to a drain of the fourth MOSFET, and an anode of the third diode is connected to an anode of the fifth diode.

8. The AC-to-DC conversion apparatus according to claim 7, wherein a source of the first MOSFET is connected to the drains of the second and the fourth MOSFETs, and a drain of the first MOSFET is connected to the anodes of the third and the fifth diodes through the output capacitor.

9. The AC-to-DC conversion apparatus according to claim 8, wherein:

in a positive half cycle of the AC input, the second MOSFET is kept at an on-state, the fourth MOSFET is served as a master switch, and in a negative half cycle of the AC input, the fourth MOSFET is kept at the on-state, the second MOSFET is served as the master switch.

10. The AC-to-DC conversion apparatus according to claim 1, wherein the first switch-element and the second group of switch-elements are implemented by controllable switch-elements and the controllable switch-elements are MOSFETs, wherein the first group of switch-elements are implemented by diodes, wherein the first switch-element is a first MOSFET, the second switch-element is a second diode, the third switch-element is a third MOSFET, the fourth switch-element is a fourth diode, and the fifth switch-element is a fifth MOSFET, wherein an anode of the second diode is connected to a drain of the third MOSFET, an anode of the fourth diode is connected to a drain of the fifth MOSFET, a cathode of the second diode is connected to a cathode of the fourth diode, and a source of the third MOSFET is connected to a source of the fifth MOSFET.

11. The AC-to-DC conversion apparatus according to claim 10, wherein a drain of the first MOSFET is connected to the sources of the third and the fifth MOSFETs, and a source of the first MOSFET is connected to the cathodes of the second and the fourth diodes through the output capacitor.

12. The AC-to-DC conversion apparatus according to claim 11, wherein:

in a positive half cycle of the AC input, the third MOSFET is kept at an on-state, the fifth MOSFET is served as a master switch, and in a negative half cycle of the AC input, the fifth MOSFET is kept at the on-state, the third MOSFET is served as the master switch.

13. The AC-to-DC conversion apparatus according to claim 1, the first switch-element is implemented by a diode, the first group of switch-elements and the second group of switch-elements are implemented by controllable switch-elements, and the controllable switch-elements are MOSFETs, wherein the first switch-element is a first diode, the second switch-element is a second MOSFET, the third switch-element is a third MOSFET, the fourth switch-element is a fourth MOSFET, and the fifth switch-element is a fifth MOSFET, wherein a source of the second MOSFET is connected to a drain of the third MOSFET, a source of the fourth MOSFET is connected to a drain of the fifth MOSFET, a drain of the second MOSFET is connected to a drain of the fourth MOSFET, and a source of the third MOSFET is connected to a source of the fifth MOSFET.

14. The AC-to-DC conversion apparatus according to claim 13, wherein an anode of the first diode is connected to the drains of the second and the fourth MOSFETs, and a cathode of the first diode is connected to the sources of the third and the fifth MOSFETs through the output capacitor.

15. The AC-to-DC conversion apparatus according to claim 13, wherein anode of the first diode is connected to the drains of the second and the fourth MOSFETs through the output capacitor, and a cathode of the first diode is connected to the sources of the third and the fifth MOSFETs.

* * * * *